United States Patent [19]

Heine et al.

[11] Patent Number: 6,030,913

[45] Date of Patent: Feb. 29, 2000

[54] SILICON CARBIDE ARTICLES REINFORCED WITH SHORT GRAPHITE FIBERS

[75] Inventors: Michael Heine, Allmannshofen; Udo Gruber, Neusäss, both of Germany

[73] Assignee: SGL Technik GmbH, Germany

[21] Appl. No.: 09/026,347

[22] Filed: Feb. 19, 1998

[30] Foreign Application Priority Data

Mar. 12, 1997 [DE] Germany .......................... 197 10 105

[51] Int. Cl.[7] .................................................. C04B 35/56
[52] U.S. Cl. ............................................... 501/88; 501/90
[58] Field of Search ........................................ 501/88, 90

[56] References Cited

U.S. PATENT DOCUMENTS

| | | | |
|---|---|---|---|
| 4,150,998 | 4/1979 | Morelock | ................................. 106/44 |
| 4,513,030 | 4/1985 | Milewski | ............................... 427/227 |
| 5,380,472 | 1/1995 | Goedtke et al. | ....................... 264/29.5 |

FOREIGN PATENT DOCUMENTS

| | | |
|---|---|---|
| 3933039 | 4/1991 | Germany . |
| 4438456 | 5/1996 | Germany . |
| WO 94/15888 | 7/1994 | WIPO . |

OTHER PUBLICATIONS

Fitzer, E., et al, *Chem.–Ing.–Tech.* 57:737–746 [passages in English translation] (1985).

DLR, PR 10/89 A: WB–BK 4./1 [(2) pages; passages in English translation].

*Primary Examiner*—Paul Marcantoni
*Attorney, Agent, or Firm*—Connolly Bove Lodge & Hutz

[57] ABSTRACT

A composite material article reinforced with high strength short graphite fibers and having a matrix substantially consisting of silicon carbide is prepared which has an elongation at break of 0.25 to 0.5% and thus exhibits quasi-ductile failure behavior. The short reinforcing graphite fibers are enclosed by at least two shells of graphitized carbon which have been obtained by impregnation with carbonizable impregnating agents and subsequent carbonization. The shell closest to the graphite fibers contains no cracks. The outermost shell is partially converted into silicon carbide. The starting material used comprises long or short fiber prepregs, which are first carbonized, then subjected at least once to an operation consisting of impregnation with a carbonizable impregnating agent and recarbonization, then graphitized at a temperature of up to maximum of 2400° C. and then comminuted to yield a dry material for the production of a precursor article. This dry material is then mixed with a binder having a high carbon content and the mixture is compression molded to yield a green article. The green molding is then carbonized and afterwards infiltrated with liquid silicon, with the carbon matrix of the carbonized precursor article being converted into silicon carbide.

16 Claims, No Drawings

SILICON CARBIDE ARTICLES REINFORCED WITH SHORT GRAPHITE FIBERS

BACKGROUND OF THE INVENTION

This invention relates to a composite material containing carbon and a matrix of silicon carbide and silicon and reinforced with carbon fibers, which material has relatively high elongation at break, and to a process for the production of such a composite material.

Composite materials having a high temperature resistant ceramic matrix reinforced with high temperature resistant fibers have met with remarkable success in many areas of advanced technology. They are used, for example, as a facing material for critical points on the outer skin of reusable space vehicles, for jet engine nozzle liners, for turbine blades, for highly stressed structural components in mechanical engineering and for friction linings. However, other than specific applications and use for development and test purposes, these materials have not hitherto been used more widely. The reason for this resides in their failure behavior. If defects, for example notches, are present in the surface or if defects occur or are present in the structure of articles consisting of these composite materials, they fail catastrophically with unrestrained crack propagation when loaded, as, unlike in metals, stress peaks cannot be dissipated by any sliding action in the crystal lattice. Such failure occurs, for example, in high strength silicon carbide reinforced with silicon carbide fibers which are perfectly bonded to the matrix. Since the occurrence of such failure is statistically highly variable, components made from these brittle composite materials frequently cannot fulfill the requirements placed upon them, especially if economic criteria must also be taken into account.

One objective of material development has thus been to reduce the brittleness of composite materials, i.e. to reduce their modulus of elasticity and to raise their elongation at break. One material which adequately exhibits this combination of properties is carbon reinforced with fibers of carbon or graphite (CFC). This material is thus used, for example, as a friction lining in high performance aircraft brakes. One disadvantage of this material is, however, the low oxidation resistance of the carbon, which results in high wear in CFC components if they cannot be kept under a protective gas. There are applications without inert gas protection such as brake material or as protective heat shields on high performance aerospace vehicles. While applying oxidation-inhibiting protective coatings has brought about some improvements, it cannot solve the problem completely.

One branch of material development then pursued the production of silicon carbide articles reinforced with fibers of carbon or graphite in which the C fibers are, on the one hand, protected from oxidation by the surrounding SiC matrix and, on the other, bonding of the C fibers is imperfect such that, while the fibers still provide a good reinforcing action, crack propagation is inhibited at the fiber interfaces by energy consumption and relatively elastic failure behavior is achieved. The production of such a material has hitherto been considered problematic because, at elevated temperatures, silicon and carbon very readily react to yield silicon carbide, i.e. the C fibers are at least partially converted into SiC, so losing their reinforcing action, and because production from C fibers and silicon carbide powder by, for example, hot pressing proved insufficiently successful.

One improvement to the situation was achieved by coating the carbon fibers using the CVD process (CVD=chemical vapor deposition) with protective layers of high-melting substances such as pyrocarbon, TiC, TiN or SiC before impregnation with liquid silicon (E. Fitzer et al. Chemie-Ingenieur-Technik 57, no. 9, pp. 737–746 (1985), in this case p. 738, right hand column). This protective action of pyrolytically deposited carbon is also exploited in DE-PS 39 33 039 C2, in accordance with which moldings made from short carbon fibers or carbon felts are initially coated with a first layer of pyrolytic carbon, then graphitized and subsequently provided with a second layer of pyrocarbon, before they are subjected to siliconization with liquid silicon. One disadvantage of this process is the use of the comparatively costly CVD or CVI process (CVI=Chemical Vapor Infiltration), in accordance with which, if it is used only once per process stage, microcracks remain in the pyrocarbon layers, into which silicon may subsequently penetrate and at least a proportion of the C fibers may be converted into SiC (c.f. loc. cit. Fitzer et al., p. 740, column 2) or, if multi-layer coatings are provided, production of the components is very costly.

According to another process (DE 44 38 456 Al), the process starts from specially arranged layers of bundles of continuous carbon fibers which are enclosed in a synthetic resin matrix. Once this synthetic resin article reinforced with carbon fiber bundles has been carbonized, the article exhibits, thanks to the particular production method used, substantially translaminar channels which are filled with liquid silicon during siliconization. The introduced silicon is then substantially reacted with the carbon matrix to yield silicon carbide (c.f. also DLR notice PR 10/89 A: WB-BK 4./1). In this case too, the production of the basic structure from long fiber non-woven fabrics is relatively elaborate, depending upon the arrangement of the C fiber bundles, the article exhibits properties which are anisotropic overall or for each ply and if one of the layers providing protection against oxidation degrades, the underlying layer of carbon fibers may always be exposed without protection.

SUMMARY AND DETAILED DESCRIPTION OF THE INVENTION

The object underlying the invention has been to provide a high temperature resistant, largely impervious composite material resistant to oxidation at continuous operating temperatures of up to 1700° C. which is produced from reinforcing carbon fibers and a matrix substantially consisting of silicon carbide and which exhibits high elongation at break, as well as to provide a process for the production of such a composite material.

The fibers reinforcing the composite material are graphitized, high strength short carbon fibers, hereinafter also known as graphite fibers, which are enclosed in a shell of graphitized carbon. This shell was obtained by coking and subsequently graphitizing a shell of a synthetic resin enclosing the graphite fibers. This shell of graphitized carbon advantageously has at least two layers. This multi-layer structure is obtained by impregnating a carbonized article, in which the C fibers are enclosed in only one carbon shell, with a synthetic resin at least once more during the production process and then refiring, i.e. carbonizing, it before finally performing graphitization. This post-treatment also seals the cracks and pores which arose during carbonization in the first, innermost shell, and through which silicon could subsequently penetrate to the graphite fibers during subsequent siliconization.

The graphite fibers enclosed in a shell of graphitized carbon are embedded in the composite material in a matrix which predominantly consists of silicon carbide and furthermore additionally contains up to 20 wt. % of free silicon and minute quantities of unreacted carbon, and the fibers are firmly bonded to this matrix. The silicon content of the matrix is advantageously below 15 wt. % and particularly preferably below 5 wt. %. This structure of reinforcing short graphite fibers provided with a graphitized shell in a matrix substantially consisting of SiC is obtained by siliconizing a carbon article reinforced with graphite fibers. The reinforcing component of this precursor article comprises the above-described, high strength short graphite fibers provided with the shells. They are bound in the precursor article in a matrix of carbon produced from a synthetic resin/solid pitch mixture, which may be either ungraphitized or graphitized. During siliconization, substantially only the carbon or graphite matrix of the precursor article is converted into SiC, while the graphite fibers protected in their shell are not attacked. It is, however, unavoidable that the boundary zones of the shell, which has at least two layers, and which encloses the graphite fibers, which boundary zones are also adjacent to the matrix, are partially converted to SiC during siliconization. The composite article furthermore still contains small quantities of carbon from the original matrix which have not been converted into silicon carbide.

An article of this structure consisting of silicon carbide reinforced with short graphite fibers has elongation at break in the range from 0.25 to 0.5% and a fluid-accessible pore volume of no more than 5% and preferably of no more than 1%. It furthermore has further advantageous properties such as high flexural strength, good thermal and moderate electrical conductivity, resistance to fluctuating temperatures, abrasion resistance and resistance to oxidation at temperatures of up to approx. 1700° C. It is consequently particularly suitable for those applications in which the materials must withstand dynamic loads at elevated temperatures in an oxidizing atmosphere. They may thus be used, for example, as gas turbine parts, such as turbine wheels, as components of burners and nozzles, as hot gas tubes, as measurement probes and as jacket tubes for probes and also as friction materials for elevated loads, such as brake linings for high speed vehicles.

Articles made from the composite material according to the invention are produced by a multi-stage process which makes use of a series of known basic processing operations in the carbon technology sector, but which are performed in a very specific sequence and using specific process conditions and using quite specific substances.

The starting material for the production comprises high strength graphite fibers having a tensile strength of at least 3000 MPa, which may be present either in the form of continuous fibers, in fiber bundles known as "rovings", as a woven fabric or other textile fiber structures or as short fibers. The surfaces of these forms of graphite fibers are then completely coated with a synthetic resin using a known process. In the case of short fibers, mixers or calenders are used for this purpose, in which short fibers arranged in two dimensions or short fiber non-woven fabrics are covered with a sufficient quantity of resin and the excess resin is then expressed by rolling. However, it is frequently difficult to process short fibers as readily reproducible results are not achieved. Fiber rovings or fabrics woven from rovings are thus preferably used. Woven roving fabrics which have been produced from rovings containing 3000 filaments are particularly preferably used. The surfaces of the filaments of these woven fabrics are coated with a synthetic resin using one of the conventional prepreg techniques. It is also possible to make direct use of waste from prepreg production or processing. Any synthetic resin may be used for the C fiber coating process stage. Preferred synthetic resins are, however, those which provide a good coke yield on carbonization, such as for example furan resins, polyimides or polyarylate resins, such as for example polyphenylenes. However, phenolic resins and, of these, resol type resins, are particularly preferred.

The fibers or fiber structures impregnated or coated with synthetic resin are then placed in a compression mold, pressed together to expel air or gases and the resin is cured while maintaining the molding pressure. The curing conditions selected are determined by the requirements of the resin used. If heat curing resins are used, a temperature-controllable compression mold must be used. If prepregs are used, it is advisable to interleave the individual plies with release films or paper release sheets during compression and curing. If short fiber compositions produced in mixers, such as for example Z arm kneaders, are to be compressed and cured, the compression mold should also be filled in layers interleaved with such cokable release means.

The compressed and cured articles are then subjected to one of the known firing or carbonization processes, which is always performed with exclusion of oxidizing substances, i.e. either under protective gas or by enclosing the material to be fired with oxidizing media acting as a getter, in particular an oxygen-binding substance. In order to achieve a good coke yield, this process stage is performed using a comparatively flat temperature gradient during the heating phase in the range from 300 to 600° C. of at most 4° C. per hour or coking is performed under pressure. The final temperature in this process stage should not exceed 1250° C. The preferred final temperature is 850 to 950° C.

The fired, i.e. coked or carbonized article is now impregnated at least once more with a carbonizable agent and subjected to a firing process or so-called refiring process. The so-called vacuum/pressure method is advantageously used for impregnation. Other known processes may, however, also be used. Impregnating agents which may be used are any substances known for impregnating carbon components and having a coke yield of more than 30 wt. %, such as for example phenolic resins of the novolak or resol type, furan resins and impregnating pitches. Refiring is also performed with exclusion of oxidizing substances. In this case, however, it may be performed relatively rapidly, i.e., for example, with a heating period to the final temperature, which is within the same ranges as in the carbonization stage described above, of 8 to 10 hours. This process stage is intended to apply one or more additional carbon shell(s) onto the existing shell and to seal any cracks and pores still present in the first shell after the first carbonization stage. Depending upon the intended protective action for the fibers, this impregnating and refiring operation may also be performed repeatedly, for example three times.

The article, which has been reimpregnated and refired once or more, is now graphitized. Any known graphitizing processes may be used for this stage. Graphitizing should be performed within the temperature range from 1800 to 2400° C., preferably in the temperature range from 1800 to 2200° C. If higher temperatures are used, fiber strength decreases so that the fibers no longer exert their full reinforcing action in the composite material.

After graphitization, the article, which may readily be split into easily handled parts, especially in the presence of release agent layers, which are now carbonized and graphitized, is comminuted. Comminution is performed with the assistance of those grinding units which comminute the fibers as little as possible. Chopping mills having a screen pack with large screen apertures are thus preferably used. Mills operating on the impact or striking principle are not suitable as they reduce the fibers to such small fragments that an adequate reinforcing action is no longer achieved in the finished composite article. If the ground material has an overall content of graphite fibers of a length of 1 mm of 18 wt. % or above, an adequate reinforcing action may still be achieved in the final product.

Comminution of the graphitized article concludes the process stages for the production of the dry material component for the production of the CFC precursor article intended for siliconization (CFC=carbon fiber reinforced carbon, including any graphitic forms of carbon).

This CFC precursor article is produced by firstly mixing the ground material obtained by comminution with a carbonizable binder. Any mixers usual in carbon processing may be used for this purpose. Preferably, however, a slow running mixer is used in which damage to or comminution of the C fiber fragments provided with the carbon shells is, as far as possible, minimized. Binders which may be used are any binders which contain carbon and are from the group consisting of synthetic resins, pitches and, preferably, mixtures of synthetic resins and pitches. Preferred binders from the synthetic resins group are phenolic resins and furan resins. It is also possible to use synthetic resins having higher coke yields than the above-stated resins, such as for example polyarylate resins, if the cost situation permits. The pitches used are preferably those having softening points to DIN 52025 of above 90° C. Mixtures of synthetic resin and pulverous solid pitch are, however, particularly preferred. Pitches suitable for this purpose have a softening point to DIN 52025 within the range from 130 to 260° C. Mesophase pitches are also suitable, if the cost situation permits. The pitches have a grain size in the range from 1 to 60 $\mu$m. Suitable synthetic resins are those stated above for this process stage, with resol type phenolic resins and furan resins being preferred. The mixing ratio during production of a resin/pitch mixture may vary within broad limits. At very low solid pitch contents, the pitch does not adequately perform its coke yield raising action. Excessively high solid pitch contents result in processing problems. A mixture prepared from 3 to 5 parts by weight of synthetic resin with one part by weight of solid pitch has proved favorable. A moldable composition is prepared from the fibrous dry material and the binder by mixing 1 to 2 parts by weight of dry material with 1 part by weight of binder. If pure pitch binders are used, the mixers must be temperature-controllable, while mixing must be performed at room temperature when synthetic resin or synthetic resin/pitch mixtures are used.

On completion of the mixing operation, which takes at most 30 minutes, the mixture is transferred into the cavity of a compression molding machine or into the compression container of an isostatic press, compacted and, in the case of binders containing synthetic resin, cured. In the case of pure pitch binders, after pressing, the compression mold must be cooled while maintaining the pressure until the binder has solidified. The molding pressure acting on the composition is at least 10 and at most 30 bar for all the mixtures considered here. The temperature used to cure the particular binder containing synthetic resin is determined by the synthetic resin used and may be found in the manufacturer's processing instructions or may be determined by simple testing. The time which must elapse for curing, during which the molding pressure must also be maintained, is dependent upon the size of the molding to be produced and the synthetic resin used. In the case of conventional binder resins, the curing operation lasts 30 minutes to 5 hours.

Once cured, the molding is removed from the compression mold and carbonized. The final temperature in this process stage should not exceed 1250° C. For economic reasons, the preferably used final temperature is in the range from 850 to 950° C. As with all the carbonization or firing stages of this production process, this stage must also be performed in such a manner that oxidizing substances are not allowed to come into contact with the moldings to be fired. The firing process must be performed in this case in such a manner that an elevated coke yield is obtained from the binder or binder system. This is achieved by using a pressure coking process or by maintaining a flat temperature gradient, preferably of below 4° C. per hour, during the heating phase in the range from 300 to 600° C.

In order to optimize the elongation at break of the final product of this production process, it may be advantageous to perform a further graphitization stage after this carbonization process. It is, however, not essential to perform such a measure and it may be omitted on economic grounds. This stage may be performed using any process known to the person skilled in the art for this purpose. Care must, however, be taken to ensure that the final temperature during graphitization does not exceed 2400° C. Temperatures of 1800 to 2200° C. are preferably used.

The final stage of the series of sub-processes according to the invention is siliconization of the graphitized CFC precursor article. Siliconization with liquid silicon known from the prior art is used for this purpose (c.f., for example, E. Fitzer et al. Chemie-Ingenieur-Technik 57 no. 9, pp. 737–746 (1985)). In this process, the article to be siliconized, which must have an open pore system throughout the entire article, is located in a container containing molten silicon in the bottom. Due to its excellent carbon wetting properties, the silicon penetrates into all the pores and cracks of the CFC article by capillary action and reacts therein with the matrix carbon to yield silicon carbide. In the case of sufficiently high temperatures, which may be of the order of approximately 2200° C., and sufficiently long exposure times, the carbon articles may, if sufficient quantities of silicon are present, also be completely converted into SiC, a situation which must be avoided. It must be borne in mind that graphitic, very well ordered forms of carbon are more slowly converted to SiC than those which, crystallographically, are less well ordered, such as for example ungraphitized carbon which has only been fired.

Processing conditions during performance of this process stage must accordingly be selected such that, on the one hand, substantially only the carbon matrix is converted into silicon carbide and that, on the other hand, the proportion of short graphite fibers enclosed in graphitized carbon remains substantially unconverted so that the graphite fibers may firstly have a reinforcing action. Secondly, any cracks which may occur in the composite material article on loading and which propagate in the brittle matrix are able to dissipate their propagation energy on meeting the imperfectly structured transitional zones from the matrix, through the carbon shells to the fibers, such that crack propagation comes to a standstill. Thirdly, elongation and creep processes may occur in and on the shells of graphitized synthetic resin carbon which enclose the graphite fibers and which constitute the transition between the graphite fibers and the silicon carbide matrix.

Siliconization may be performed within the temperature range from 1450 to 2200° C. Preferably, however, the process is performed under a vacuum within the temperature range from 1650 to 1750° C., wherein the vessel used for siliconization or the furnace used for siliconization is preferably purged with an inert gas, for example with argon, before the beginning of the process in order to remove any residues of reactive gases. Subject to the particular technical features of the siliconization unit, heating of the reactor to reaction temperature may proceed rapidly.

Once the siliconization temperature has been reached, the time required for infiltration and reaction to yield SiC ranges from 10 minutes to 1 hour. An impregnation and reaction time of 0.5 hours is preferably used. The stated impregnation and reaction times permit economic -processing. Where circumstances require, longer times may also be used. Siliconization without application of a vacuum is also possible. In this case, siliconization must be performed, still under an inert gas, at temperatures of 2100 to 2200° C. The sum of infiltration and reaction time is between 10 minutes and 1 hour in this case too, preferably 0.25 hours. However, at these higher temperatures, great attention must be paid to maintaining the reaction conditions once they have been determined by preliminary testing, as the reaction of silicon with carbon to yield SiC proceeds substantially more rapidly at such temperatures.

The so-called wick method is advantageously used for any siliconization. In this method, the articles to be siliconized rest on porous carbon supports which are highly absorbent in relation to silicon and the lower part of which stands in the liquid silicon. The silicon then rises through these wicks into the articles to be siliconized without these articles being in direct contact with the silicon bath. This method eliminates costly cleaning operations after siliconization.

EXAMPLE

The invention is illustrated below by means of an explanatory Example:

The explanatory Example demonstrates the production of a composite material article according to the invention from a prepreg. The prepreg was produced using a twill weave fabric of a weight per unit area of 240 g/m$^2$ consisting of 3K graphite fiber rovings (rovings made from 3000 individual filaments). This woven fabric was impregnated with an aqueous resol type phenolic resin system (14 wt. % water, determination of water content using the Karl Fischer method, ISO 760) in a conventional prepreg production unit and the excess phenolic resin was expressed with rollers. The prepreg plies obtained in this manner were then placed in a compression mold, wherein release papers were laid between the individual prepreg layers. Once the mold had been filled, the stack of prepreg layers was cured for 3 hours at a temperature of 140° C. under a pressure of 5 N/mm$^2$.

It is also possible simply to stack the prepregs with interleaved release papers or release films, i.e. to cure them without pressure, and to introduce this stack directly into a firing or carbonization process with a moderate heating rate. This shortened process is used if the finished product is not required to be of the highest quality.

After removal from the compression mold, the compacted and cured stacks of prepregs were carbonized in a protective-gas furnace under a pure nitrogen atmosphere with a heating time of 144 hours up to a final temperature of 900° C. The temperature gradient during heating was no more than 4° C. per hour at any point of the temperature profile in the range from 300 to 600° C. After cooling to removal temperature, which is performed as rapidly as possible under protective gas, the carbonized article was impregnated with a novolak type phenolic resin (Bakelite IT 491) and then heated within 8 hours to a temperature of 950° C. in a protective-gas furnace. The temperature was then reduced to room temperature, which took approximately 16 hours.

This first impregnation and refiring stage was followed by another. In this case, however, the article was impregnated with a coal-tar based impregnating pitch having a softening point to DIN 52025 of 60° C., as is used in the production of graphite electrodes. This impregnation operation was followed by another refiring stage which proceeded under the same conditions as the first refiring operation (8 hours heating to 950° C., cooling approximately 16 h). Finished products having particularly good properties may be obtained by performing after this process stage a third impregnation and refiring process using either a synthetic resin or an impregnating pitch. The resultant, recompacted carbon articles were then graphitized by heating under protective gas to a temperature of 2200° C. and maintaining this temperature for 20 minutes.

After removal from the graphitizing furnace, the articles were split into thin layers, this being greatly facilitated by the release papers interleaved during stacking of the prepregs, and the resultant layers and fragments were ground. Grinding was performed using a Rotoplex model chopping mill from Hosokawa Alpine AG, Augsburg, with a screen pack having apertures with a clear opening of 5 mm. The particle fraction between 0.25 mm and 2 mm constituted 48% of the ground material, and the fraction larger than 2.0 mm 1%. The ground material was then mixed, without further classification, with a binder at room temperature in a Z arm kneader to yield a moldable composition.

The binder used was a mixture of a resol type phenolic resin with a finely ground coal-tar pitch (grain size $\leq 20 \mu$m), which had a softening point (DIN 52025) of 230° C. and a coke yield (to DIN 51 905) of 82%.

The material to be mixed was of the following composition: 150 g of phenolic resin, 45 g of coal-tar pitch and 275 g of ground dry material. Mixing was performed by initially introducing the resin component into the mixer, then incorporating the pitch and then, once the ground material had been added, continuing mixing for 15 minutes. Once mixing was complete, the mixture was transferred into the heatable cavity of a compression molding press, heated therein under specific molding pressure of 15 bar to a curing temperature of 150° C. and completely cured under these conditions for 2 hours. Once removed from the mold, the cured article was carbonized, with the same conditions being used as for the prepreg carbonization described above (heating under protective gas to 900° C. within 144 hours, wherein in the range from 300 to 600° C. the temperature gradient should not exceed 4° C. per hour; cooling under protective gas). The fired or carbonized articles were then transferred into a protective-gas furnace and graphitized therein under argon as the protective gas by heating to a temperature of 2200° C. and maintaining this temperature for 15 minutes. As may be seen from the following details, the external dimensions (length×width×thickness in mm) of the molding remained virtually unchanged throughout the process from the green, via the fired to the graphitized state. The variation in bulk density in relation to the process is also stated:

"green" molding, i.e. uncarbonized but cured:
160×160×13.8 mm; bulk density 1.20 g/cm$^3$, carbonized molding before reimpregnation and refiring:
160×160×13.8 mm; bulk density 1.03 g/cm$^3$, graphitized molding:

160×160×13.7 mm; bulk density 1.03 g/cm³.

Since the external dimensions of the molding also remain virtually unchanged during the subsequent siliconization, it is possible by using the present process to produce moldings of specified dimensions without substantial further processing stages being required. The graphitized molding was then transferred into an inductively heated vacuum siliconization furnace. In the bottom of the furnace was a trough containing silicon, in which were located three columnar supports made from highly porous CFC material, on which the article to be siliconized was laid. In the subsequent siliconization, these columns acted as wicks to transfer the silicon from the silicon melt to the article. Siliconization was performed by evacuating the furnace to an internal pressure of 3 mbar or less and heating it to a temperature of 1750° C. within 2 hours. Once the final temperature had been reached, the temperature was maintained at a temperature of 1750° C. for a further 10 minutes and then reduced as rapidly as possible. Cooling was accelerated by repeated purging with a protective gas. The composite material produced using this process had the following properties (strength data measured using the 3-point test method on samples of dimensions 100×10×6 mm):

Flexural strength: 57.3 MPa
Elongation at break: 0.28%
Modulus of elasticity: 42600 MPa
Bulk density[1]): 2.27 g/cm³.
1) Determined to DIN 51918.

The articles produced using the process described above do not exhibit brittle failure behavior in flexural testing. They break like a quasi-ductile material.

The invention allows the effective production of oxidation-protected composite materials which are reinforced with high strength short graphite fibers and which may be exposed to severe dynamic loads at elevated temperature and have a matrix predominantly consisting of silicon carbide. Despite the number of process stages to be performed, the stated production process allows low cost production of composite material articles according to the invention because performance of the process, on the one hand, involves the use of known carbon technology processing stages and, on the other, dimensionally accurate articles may be produced directly.

Further explanation of the process for the production of articles according to the invention is provided by the following flow chart:

We claim:

1. Composite material with an open pore volume of at most 5% comprising
   a) reinforcing short graphite fibers of a length of 0.1 to 5 mm homogeneously distributed throughout the composite material and associated with a shell of graphitized carbon partially converted into silicon carbide, which graphitized carbon has been obtained by coking of synthetic resins and subsequent graphitization, and
   b) a matrix comprising carbon, silicon carbide and elemental silicon, and containing up to 20 wt. % of elemental silicon.

2. Composite material according to claim 1, wherein the shell of graphitized carbon enclosing the reinforcing short graphite fibers contains no open cracks or pores.

3. Composite material according to claim 1, having an open pore volume of $\leq 1\%$.

4. Composite material according to claim 1, wherein the matrix comprising carbon, silicon carbide and elemental silicone contains no more than 15 wt. % of elemental silicon.

5. Composite material according to claim 1, wherein the graphite fibers are enclosed in a shell of graphitized carbon consisting of at least two layers, each layer obtained by a separate coking process of synthetic resins before subsequent graphitization.

6. Composite material according to claim 2, wherein the graphite fibers are enclosed in a shell of graphitized carbon consisting of at least two layers, each layer obtained by a separate coking process of synthetic resins before subsequent graphitization.

7. Composite material according to claim 1, wherein a second shell of graphitized carbon of the graphite fibers is formed by graphitization of a precursor article, in which the graphite fibers having the first shell of graphtiized carbon are bound into a matrix of carbon produced from a binder selected from the group consisting of synthetic resins, pitches and mixtures of synthetic resins and pitches.

8. Composite material according to claim 5, wherein a second shell of graphitized carbon of the graphite fibers is formed by graphitization of a precursor article, in which the graphite fibers having the first shell of graphitized carbon are bound into a matrix of carbon produced from a binder selected from the group consisting of synthetic resins, pitches and mixtures of synthetic resins and pitches.

9. Composite material according to claim 1, having an elongation at break of from 0.25 to 0.5%.

10. Composite material according to claim 6 having an elongation at break of from 0.25 to 0.5%.

11. Composite material according to claim 1, wherein the material is used as a friction material for elevated loads.

12. Composite material according to claim 10, wherein the material is used as a friction material for elevated loads.

13. Composite material according to claim 1, wherein the material is used as a brake lining for vehicles.

14. Composite material according to claim 10, wherein the material is used as a brake lining for vehicles.

15. Composite material as in claim 1, wherein the material is used as an article for use at elevated temperatures selected from the group consisting of gas turbine parts, turbine wheels, components of burners and nozzles, hot gas tubes, measurement probes and jacket tubes.

16. Composite material as in claim 10, wherein the material is used as an article for use at elevated temperatures selected from the group consisting of gas turbine parts, turbine wheels, components of burners and nozzles, hot gas tubes, measurement probes and jacket tubes.

* * * * *

UNITED STATES PATENT AND TRADEMARK OFFICE
CERTIFICATE OF CORRECTION

PATENT NO. : 6,030,913
DATED : February 29, 2000
INVENTOR(S) : Michael Heine, et al.

It is certified that error appears in the above-indentified patent and that said Letters Patent is hereby corrected as shown below:

Column 9, line 47, after "flow chart:", insert the following flow chart.

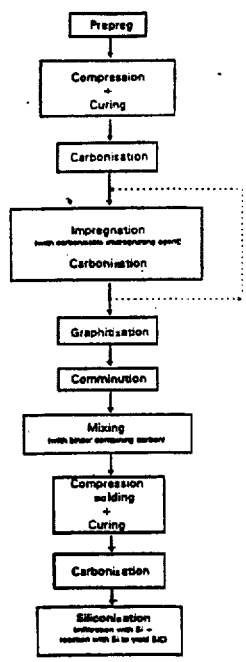

Signed and Sealed this

Twenty-seventh Day of March, 2001

Attest:

NICHOLAS P. GODICI

Attesting Officer

Acting Director of the United States Patent and Trademark Office